(12) United States Patent
Eckert et al.

(10) Patent No.: US 12,531,072 B2
(45) Date of Patent: Jan. 20, 2026

(54) METHODS AND DEVICES FOR ENCODING AND/OR DECODING SPATIAL BACKGROUND NOISE WITHIN A MULTI-CHANNEL INPUT SIGNAL

(71) Applicant: Dolby Laboratories Licensing Corporation, San Francisco, CA (US)

(72) Inventors: Michael Eckert, New South Wales (AU); Rishabh Tyagi, New South Wales (AU)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 325 days.

(21) Appl. No.: 18/000,862

(22) PCT Filed: Jun. 10, 2021

(86) PCT No.: PCT/US2021/036714
§ 371 (c)(1),
(2) Date: Dec. 6, 2022

(87) PCT Pub. No.: WO2021/252705
PCT Pub. Date: Dec. 16, 2021

(65) Prior Publication Data
US 2023/0215445 A1 Jul. 6, 2023

Related U.S. Application Data

(60) Provisional application No. 63/193,946, filed on May 27, 2021, provisional application No. 63/037,650, filed on Jun. 11, 2020.

(51) Int. Cl.
*G10L 19/008* (2013.01)
*G10L 19/012* (2013.01)
(Continued)

(52) U.S. Cl.
CPC ........ *G10L 19/008* (2013.01); *G10L 21/0224* (2013.01); *G10L 25/78* (2013.01)

(58) Field of Classification Search
CPC ..... G10L 19/008; G10L 19/012; G10L 19/02; G10L 19/0204; G10L 19/0208;
(Continued)

(56) References Cited

U.S. PATENT DOCUMENTS 7,912,712 B2 3/2011 Shlomot
10,224,046 B2 3/2019 Dickins
(Continued)

FOREIGN PATENT DOCUMENTS

CN 101399041 A 4/2009
EP 2936487 B1 6/2016
(Continued)

OTHER PUBLICATIONS

Lombard, A. et al "Frequency-Domain Comfort Noise Generation for Discontinuous Transmission in EVS" IEEE Icassp 2015, pp. 5893-5897.
(Continued)

*Primary Examiner* — Leshui Zhang

(57) ABSTRACT

The present document describes a method (600) for encoding a multi-channel input signal (101) which comprises N different channels. The method (600) comprises, for a current frame of a sequence of frames, determining (601) whether the current frame is an active frame or an inactive frame using a signal and/or a voice activity detector, and determining (602) a downmix signal (103) based on the multi-channel input signal (101), wherein the downmix signal (103) comprises N channels or less. In addition, the method (600) comprises determining (603) upmixing metadata (105) comprising a set of parameters for generating, based on the downmix signal (103), a reconstructed multi-
(Continued)

channel signal (111) comprising N channels, wherein the upmixing metadata (105) is determined in dependence of whether the current frame is an active frame or an inactive frame. The method (600) further comprises encoding (604) the upmixing metadata (105) into a bitstream.

1 Claim, 8 Drawing Sheets

(51) Int. Cl.
*G10L 21/0224* (2013.01)
*G10L 25/78* (2013.01)

(58) Field of Classification Search
CPC ... G10L 19/025; G10L 19/022; G10L 19/028; G10L 19/03; G10L 19/06; G10L 19/07; G10L 19/167; G10L 19/173; G10L 19/18; G10L 19/20; G10L 19/22; G10L 19/24; G10L 21/00; G10L 21/003; G10L 21/02; G10L 21/0208; G10L 2021/02085; G10L 2021/02082; G10L 2021/02087; G10L 21/0216; G10L 2021/02161; G10L 2021/02163; G10L 2021/02165; G10L 2021/02166; G10L 2021/02168; G10L 21/0224; G10L 21/0232; G10L 21/0264; G10L 21/0308; G10L 21/028; G10L 21/0272; G10L 21/0364; G10L 2021/03643; G10L 2021/03646; G10L 21/038; G10L 21/0388; G10L 25/03; G10L 25/06; G10L 25/21; G10L 25/27; G10L 25/78; G10L 2025/783; G10L 25/81; G10L 25/84; G10L 25/87; G10L 2025/903; G10L 25/90; G10L 2025/906; G10L 25/93; G10L 2025/932; G10L 2025/935; G10L 2025/937; G10L 99/00
USPC ............... 704/500–504; 381/1–23; 700/94
See application file for complete search history.

(56) References Cited

U.S. PATENT DOCUMENTS

| | | | |
|---|---|---|---|
| 2009/0125313 A1* | 5/2009 | Hellmuth | G10L 19/04 704/501 |
| 2009/0222272 A1* | 9/2009 | Seefeldt | G10L 19/008 704/E21.001 |
| 2010/0114567 A1 | 5/2010 | Bruhn | |
| 2011/0004471 A1 | 1/2011 | Schandl | |
| 2011/0010167 A1 | 1/2011 | Dai | |
| 2012/0269353 A1* | 10/2012 | Herre | G10L 19/20 704/500 |
| 2013/0006622 A1 | 1/2013 | Khalil | |
| 2013/0301835 A1 | 11/2013 | Briand | |
| 2013/0332176 A1 | 12/2013 | Setiawan | |
| 2015/0221313 A1* | 8/2015 | Purnhagen | G10L 19/0208 704/500 |
| 2015/0287417 A1* | 10/2015 | Disch | G10L 19/022 |
| 2016/0027447 A1 | 1/2016 | Dickins | |
| 2016/0035360 A1 | 2/2016 | Taddei | |
| 2016/0247514 A1* | 8/2016 | Villemoes | H04S 5/005 |
| 2017/0047072 A1 | 2/2017 | Eriksson | |
| 2017/0180906 A1 | 6/2017 | Chebiyyam et al. | |
| 2017/0236521 A1 | 8/2017 | Chebiyyam et al. | |
| 2019/0057704 A1 | 2/2019 | Wang | |
| 2019/0221219 A1* | 7/2019 | Wang | G10L 19/00 |
| 2019/0318752 A1 | 10/2019 | Jansson Toftgård | |
| 2020/0013417 A1 | 1/2020 | Fuchs | |
| 2021/0166708 A1 | 6/2021 | McGrath | |
| 2021/0272575 A1* | 9/2021 | Jansson | G10L 19/008 |
| 2022/0277757 A1 | 9/2022 | McGrath | |

FOREIGN PATENT DOCUMENTS

| | | |
|---|---|---|
| EP | 3511934 B1 | 4/2021 |
| JP | 2009503615 A | 1/2009 |
| JP | 2017536756 A | 12/2017 |
| JP | 2019533189 A | 11/2019 |
| NO | 2019193173 A1 | 10/2019 |
| RU | 2454737 C2 | 6/2012 |
| WO | 2019143867 A1 | 7/2019 |
| WO | 2019193149 A1 | 10/2019 |
| WO | 2019193156 A1 | 10/2019 |
| WO | WO-2020002448 A1 * | 1/2020 ........... G10L 19/008 |
| WO | 2020089510 A1 | 5/2020 |

OTHER PUBLICATIONS

McGrath, D. et al "Immersive Audio Coding for Virtual Reality Using a Metadata-Assisted Extension of the 3GPP EVS Codec" IEEE ICASSP 2019, pp. 730-734.

Wang, Zhe et al "Linear Prediction Based Comfort Noise Generation in the EVS Codec" IEEE ICASSP Aug. 2015, pp. 5903-5907.

* cited by examiner

METHODS AND DEVICES FOR ENCODING AND/OR DECODING SPATIAL BACKGROUND NOISE WITHIN A MULTI-CHANNEL INPUT SIGNAL

CROSS-REFERENCE TO RELATED APPLICATIONS

This application is a U.S. National Stage of International Application No. PCT/US2021/036714, which claims the benefit of priority from U.S. Provisional Patent Application No. 63/193,946 filed on 27 May 2021 and U.S. Provisional Patent Application No. 63/037,650 filed on 11 Jun. 2020, each one incorporated by reference in its entirety.

BACKGROUND

The sound or soundfield within the listening environment of a listener that is placed at a listening position may be described using an ambisonics signal. The ambisonics signal may be viewed as a multi-channel audio signal, with each channel corresponding to a particular directivity pattern of the soundfield at the listening position of the listener. An ambisonics signal may be described using a three-dimensional (3D) cartesian coordinate system, with the origin of the coordinate system corresponding to the listening position, the x-axis pointing to the front, the y-axis pointing to the left and the z-axis pointing up.

A multi-channel audio signal may comprise active sections of active speech or audio and other inactive sections without speech or audio, which typically only comprise background noise. The background noise may have spatial characteristics, such as an air conditioning noise coming from a particular direction.

The present document addresses the technical problem of modelling spatial background noise in an efficient manner, in particular for providing perceptually pleasing transitions between active and inactive sections of a multi-channel audio signal. The technical problem is solved by the independent claims. Preferred examples are described in the dependent claims.

SUMMARY

According to an aspect, a method for encoding a multi-channel input (audio) signal which comprises N different channels, with N>1, in particular N>2, is described. The method comprises determining whether a current frame of the multi-channel input signal is an active frame or an inactive frame, using a signal and/or a voice activity detector. Furthermore, the method comprises determining a downmix signal based on the multi-channel input signal and/or based on a target bitrate for encoding the multi-channel input signal, wherein the downmix signal comprises less than or equal to N channels. The method further comprises determining upmixing metadata comprising a set of (spatial) parameters for generating, based on the downmix signal, a reconstructed multi-channel signal comprising N channels. The upmixing metadata may be determined in dependence of whether the current frame is an active frame or an inactive frame. In addition, the method comprises encoding the upmixing metadata into a bitstream.

According to a further aspect, a method for decoding a bitstream which is indicative of a reconstructed multi-channel signal comprising N channels is described (with N being a positive integer greater than one, preferably N>2). The method comprises determining, based on the bitstream, whether the current frame is an active frame or an inactive frame. In addition, the method comprises determining a reconstructed downmix signal, wherein the reconstructed downmix signal comprises less than or equal to N channels. The method further comprises generating the reconstructed multi-channel signal based on the reconstructed downmix signal and based on upmixing metadata comprised within the bitstream. The reconstructed multi-channel signal may be generated in dependence of whether the current frame is an active frame or an inactive frame.

According to a further aspect, a software program is described. The software program may be adapted for execution on a processor and for performing the method steps outlined in the present document when carried out on the processor.

According to another aspect, a storage medium is described. The storage medium may comprise a software program adapted for execution on a processor and for performing the method steps outlined in the present document when carried out on the processor.

According to a further aspect, a computer program product is described. The computer program may comprise executable instructions for performing the method steps outlined in the present document when executed on a computer.

According to another aspect, an encoding unit for encoding a multi-channel input signal which comprises N different channels, with N being a positive integer greater than one, preferably N>2, is described. The encoding unit is configured to determine whether a current frame of the input signal is an active frame or an inactive frame using a signal and/or a voice activity detector. Furthermore, the encoding unit is configured to determine a downmix signal based on the multi-channel input signal and/or based on the bitrate, wherein the downmix signal comprises less than or equal to N channels. In addition, the encoding unit is configured to determine upmixing metadata comprising a set of parameters for generating, based on the downmix signal, a reconstructed multi-channel signal comprising N channels. The upmixing metadata may be determined in dependence of whether the current frame is an active frame or an inactive frame. The encoding unit is further configured to encode the upmixing metadata into a bitstream.

According to another aspect, a decoding unit for decoding a bitstream which is indicative of a reconstructed multi-channel signal comprising N channels is described. The reconstructed signal comprises a sequence of frames. The decoding unit is configured to determine a reconstructed downmix signal, wherein the reconstructed downmix signal comprises less than or equal to N channels. The decoding unit is further configured to determine, based on the bitstream, whether a current frame of the signal is an active frame or an inactive frame. In addition, the decoding unit is configured to generate the reconstructed multi-channel signal based on the reconstructed downmix signal and based on upmixing metadata comprised within the bitstream. The reconstructed multi-channel signal may be generated in dependence of whether the current frame is an active frame or an inactive frame.

It should be noted that the methods, devices and systems including its preferred embodiments as outlined in the present patent application may be used stand-alone or in combination with the other methods, devices and systems disclosed in this document. Furthermore, all aspects of the methods, devices and systems outlined in the present patent application may be arbitrarily combined. In particular, the features of the claims may be combined with one another in an arbitrary manner.

SHORT DESCRIPTION OF THE FIGURES

The invention is explained below in an exemplary manner with reference to the accompanying drawings, wherein FIG. 1 shows an example encoding unit and decoding unit for encoding and decoding a multi-channel signal;

DETAILED DESCRIPTION

As outlined above, the present document relates to an efficient coding of spatial comfort noise for immersive audio signals such as First Order Ambisonics (FOA) or HOA (Higher Order Ambisonics) signals. Notably FOA or HOA signals are referred to herein more generally as soundfield representation (SR) signals. An SR signal may comprise a relatively high number of channels or waveforms, wherein the different channels relate to different panning functions and/or to different directivity patterns. By way of example, an $L^{th}$-order 3D FOA or HOA signal comprises $(L+1)^2$ channels.

Figure 1:
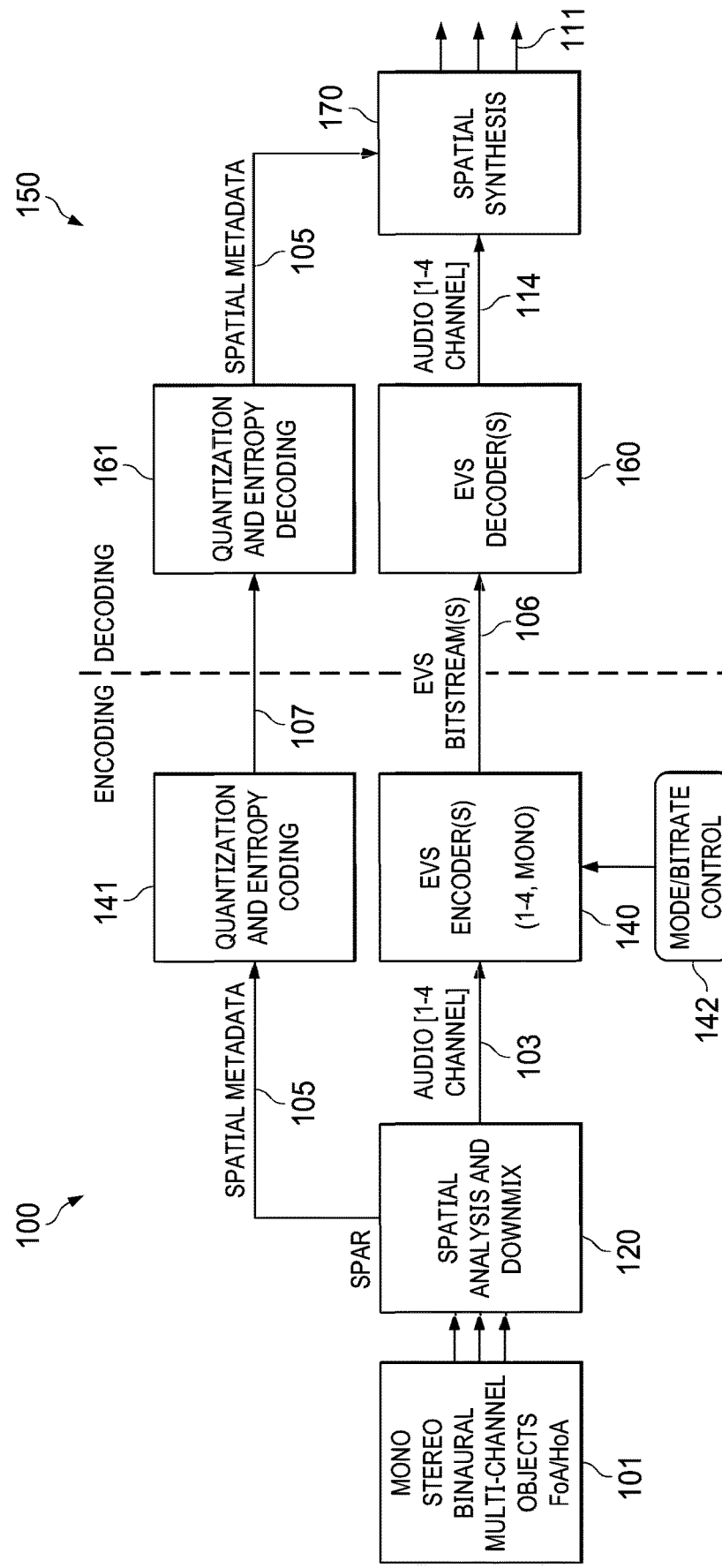

FIG. 1 illustrates an encoding unit 100 and a decoding unit 150 for encoding and decoding a multi-channel input signal 101, which may comprise an SR signal. In particular, the multi-channel input signal 101 may comprise (possibly a combination of) one or more mono signals, one or more stereo signals, one or more binaural signal, one or more (conventional) multi-channel signals (such as a 5.1 or a 7.1 signal), one or more audio objects, and/or one or more SR signals. The different signal components may be considered to be individual channels of the multi-channel input signal 101.

The encoding unit 100 comprises a spatial analysis and downmix module 120 configured to downmix the multi-channel input signal 101 to a downmix signal 103 comprising one or more channels. The downmix signal 103 may itself be an SR signal, notably a first order ambisonics (FOA) signal, if the input signal 101 comprises a HOA signal. Downmixing may be performed in the subband domain or QMF domain (e.g., using 10 or more subbands).

The spatial analysis and downmix module 120 is further configured to determine SPAR, Spatial Audio Resolution Reconstruction or Spatial Reconstruction, metadata 105 that is configured to reconstruct the multi-channel input signal 101 from the downmix signal 103. The spatial analysis and downmix module 120 may be configured to determine the SPAR metadata 105 in the subband domain. The SPAR metadata 105 is referred to herein also as upmixing metadata.

In addition, the encoding unit 100 may comprise a coding module 140 which is configured to perform waveform encoding (e.g., EVS encoding) of the downmix signal 103, thereby providing coded audio data 106. Each channel of the downmix signal 103 may be encoded using a mono waveform encoder, thereby enabling an efficient encoding. Furthermore, the encoding unit 100 comprises a quantization module 141 which is configured to quantize the SPAR metadata 105 and to perform entropy encoding of the (quantized) SPAR metadata 105, thereby providing coded metadata 107. The coded audio data 106 and the coded metadata 107 may be inserted into a bitstream. Coding of the downmix signal 103 and/or of the SPAR metadata 105 is typically controlled using a mode and/or bitrate control module 142.

Typically, operation of the spatial analysis and/or downmix module 120 is dependent on the target bitrate. In particular, the number of channels of the downmix signal 103 may be dependent on the target bitrate. A higher number of downmix channels typically allows an increased performance as it allows more waveform reconstruction than parametric reconstruction. On the other hand, a higher number of downmix channels typically leads to an increased bitrate, as an increased number of channels need to be coded by the audio coding module 140.

At low bitrates, it may be preferable to only use a single channel downmix. On the other hand, the number of downmix channels may be increased with increasing bitrate. This also applies to the DTX operation described in the present document.

The decoding unit 150 of FIG. 1 comprises a decoding module 160 which is configured to derive a reconstructed downmix signals 114 from the coded audio data 106. Furthermore, the decoding unit 150 comprises a metadata decoding module 161 which is configured to derive the SPAR metadata 105 from the coded metadata 107.

In addition, the decoding unit 150 comprises a reconstruction module 170 which is configured to derive a reconstructed multi-channel signal 111 from the SPAR metadata 105 and from the reconstructed downmix signal 114. The reconstructed multi-channel signal 111 may comprise a reconstructed SR signal. In particular, the reconstructed multi-channel signal 111 may comprise the same types of channels as the multi-channel input signal 101. The reconstructed multi-channel signal 111 may be used for speaker rendering, for headphone rendering and/or for SR rendering.

Figure 2:
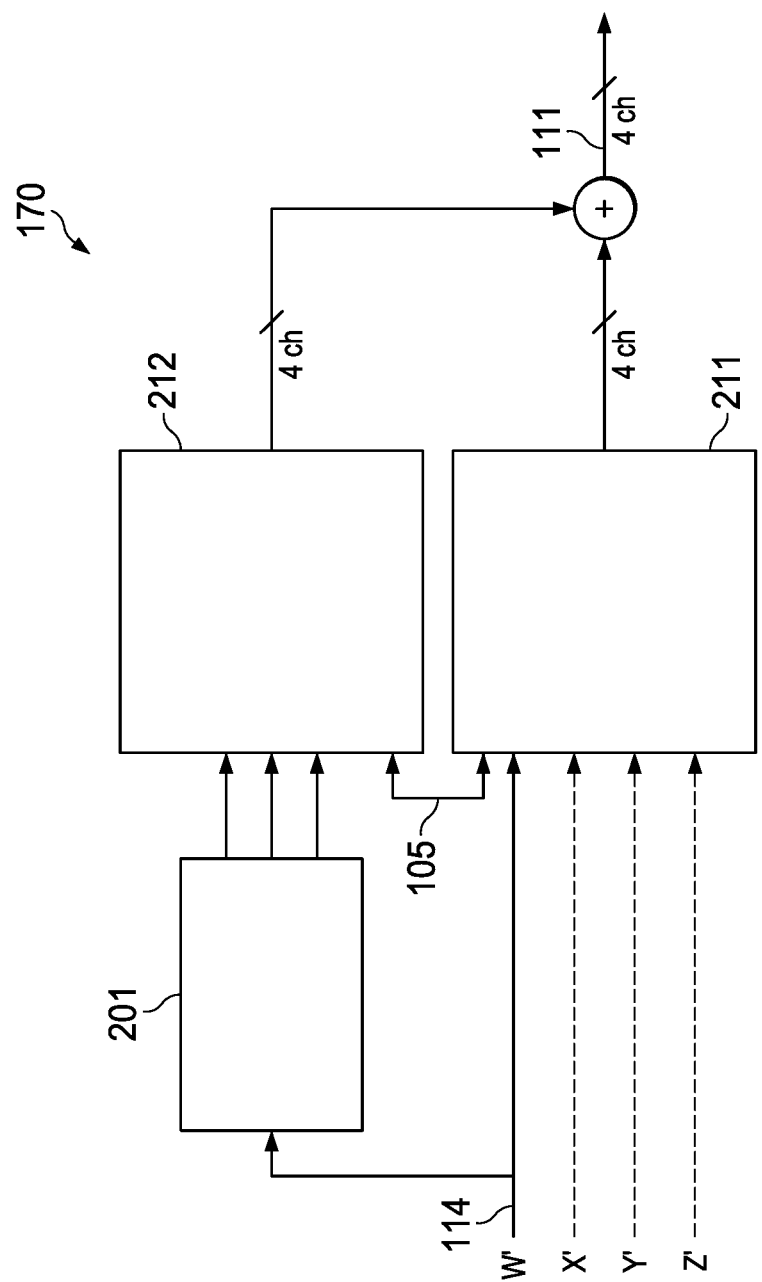
FIG. 2 shows an example spatial synthesis (or reconstruction) module.

FIG. 2 illustrates an example reconstruction module 170. The reconstruction module 170 takes as input one or more channels of the reconstructed downmix signal 114. A first mixer 211 may be configured to upmix the one or more channels of the reconstructed downmix signal 114 to an increased number of signals. The first mixer 211 depends on the SPAR metadata 105.

The reconstruction module 170 may comprise one or more decorrelators 201 which are configured to produce signals from the representation of the W channel of the reconstructed downmix signal 114 that are processed in a second mixer 212 to produce an increased number of channels. The second mixer 212 depends on the SPAR metadata 105. The output of the first mixer 211 and the output of the second mixer 212 are summed to provide the reconstructed multi-channel signal 111. The reconstructed multi-channel signal 111 may be of the same type (in particular, may comprise the same number of channels) as the multi-channel input signal 101.

The SPAR metadata 105 may be composed of data that represents the coefficients of upmixing matrices used by the first mixer 211 and/or by the second mixer 212. The mixers 211, 212 may operate in the subband domain (notably in the QMF domain). In this case, the SPAR metadata 105 comprises data that represents the coefficients of upmixing matrices used by the first mixer 211 and by the second mixer 212 for a plurality of different subbands (e.g., 10 or more subbands).

FIG. 2 illustrates the example of a one channel downmix signal 114 which comprises a representation of the W channel (referred to as W'). The first mixer 211 generates reconstructions of the predictable portions of the X, Y and/or Z channels based on W' (using the prediction coefficients from the SPAR metadata 105). The second mixer 212 generates representations of the uncorrelated residual signals X', Y' and/or Z'. In other words, the second mixer 212 uses the SPAR metadata 105 to spectrally shape signals which are uncorrelated with regards to W' in accordance to the original residual signals X', Y' and/or Z', respectively, thereby providing representations or reconstructions of the residual signals X', Y' and/or Z'.

The encoding unit 100 may be configured to convert an FOA input signal 101 into a downmix signal 103 and parameters, i.e., SPAR metadata 105, used to regenerate the input signal 101 at the decoding unit 150. The number of channels of the downmix signal 103 may vary from 1 to 4 channels. The parameters may include prediction parameters Pr, cross-prediction parameters C and/or decorrelation parameters P. These parameters may be calculated from the covariance matrix of a windowed input signal 101. Furthermore, the parameters may be calculated in a specified number of subbands. In the case of comfort noise, a reduced number of subbands (also referred to as frequency bands) may be used, e.g., 6 subbands instead of 12 subbands.

An example representation of SPAR parameter extraction may be as follows (as described with reference to FIG. 3):

1. Predict all side signals (Y, Z, X) of the input signal 101 from the main W signal of the input signal 101

$$\begin{bmatrix} W \\ Y' \\ Z' \\ X' \end{bmatrix} = \begin{bmatrix} 1 & 0 & 0 & 0 \\ -pr_Y & 1 & 0 & 0 \\ -pr_Z & 0 & 1 & 0 \\ -pr_X & 0 & 0 & 1 \end{bmatrix} \begin{bmatrix} W \\ Y \\ Z \\ X \end{bmatrix}$$

where, as an example, the prediction coefficient for predicted channel Y' may be calculated as:

$$pr_Y = \frac{R_{YW}}{\max(R_{WW}, \epsilon)} \frac{1}{\max\left(1, \sqrt{|R_{YY}|^2 + |R_{ZZ}|^2 + |R_{XX}|^2}\right)}$$

and $R_{AB}$=cov(A, B) are elements of the input covariance matrix corresponding to signals A and B. Similarly, the Z' and X' residual channels have corresponding parameters, $pr_Z$ and $pr_X$. They may be calculated by replacing the let "Y" with the letter "Z" or "X" in the above formula. The prediction parameters Pr (also referred to as PR) may be the vector of the prediction coefficients $[pr_Y, pr_Z, pr_X]^T$.

Figure 3:
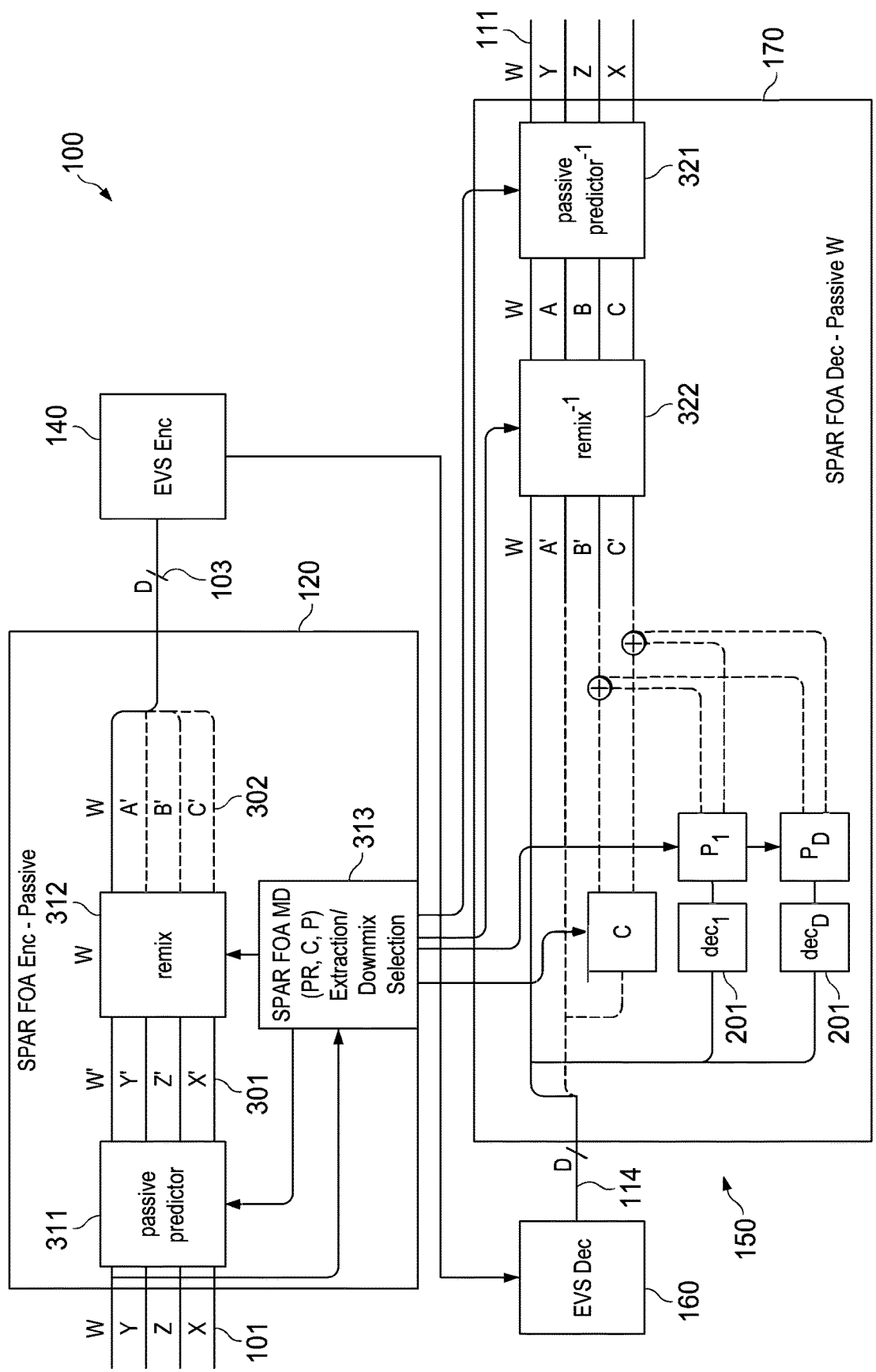
FIG. 3 shows an example encoding unit and decoding unit for SPAR encoding and SPAR decoding a multi-channel signal.

The prediction parameters may be determined within the prediction module 311 shown in FIG. 3, thereby providing the residual channels Y', Z' and X' 301.

In an exemplary implementation, W may be an active channel (or in other words, with active prediction, hereinafter referred to as W'). As an example (but not as limitation), an active W' channel that allows some kind of mixing of the X, Y, Z channels into the W channel may be defined as follows:

$$W' = W + f \cdot pr_y \cdot Y + f \cdot pr_z \cdot Z + f \cdot pr_x \cdot X$$

Here, f is the mixing factor and can be static or dynamic across time and/or frequency. In an implementation, f may vary between active and inactive frames. In other words, the mixing factor may be dependent on whether the current frame is an active frame or an inactive frame. In yet other words, the mixing of the X, Y and/or Z channel into the W channel may be different for active frames and for inactive frames. Hence, a representation of the W channel, i.e., the W' channel, may be determined by mixing the initial W channel with one or more of the other channels. By doing this, the perceptual quality may be further increased.

2. Remix the W and predicted (Y', Z', X') channels from most to least acoustically relevant. Remixing may correspond to reordering or re-combining signals, based on a defined methodology. An example methodology for remixing may be re-ordering of the input signals W, Y', X', Z', given the assumption that audio cues from left and right are more important than front-back, which are more important to up-down cues. The remix methodology may be known at the corresponding decoding unit 150, such that no parameters need to be transmitted within the bitstream. Remixing may be performed within the remixing module 312 of FIG. 3, thereby providing the remixed channels 302.

$$\begin{bmatrix} W \\ A' \\ B' \\ C' \end{bmatrix} = [\text{remix}] \begin{bmatrix} W \\ Y' \\ Z' \\ X' \end{bmatrix}$$

3. Calculate the covariance of the 4 channel post-prediction and remixing downmix 302.

$$R_{pr} = [\text{remix}][\text{predict}].R.[\text{predict}]^H[\text{remix}]^H$$

$$R_{pr} = \begin{pmatrix} R_{WW} & R_{Wd} & R_{Wu} \\ R_{dW} & R_{dd} & R_{du} \\ R_{uW} & R_{ud} & R_{uu} \end{pmatrix}$$

where dd represents the one or more extra downmix channels beyond W (i.e. the $2^{nd}$ to $n^{th}$ channels), and u represents the one or more channels that need to be wholly regenerated (i.e. n+1)$^{th}$ to $4^{th}$ channels), because they are not comprised within the downmix signal 103 (wherein n is the number of channels within the downmix signal 103).

For the example of a WABC remix 302 with 1-4 channels, d and u represent the following channels:

| n | d channels | u channels |
|---|---|---|
| 1 | — | A', B', C' |
| 2 | A' | B', C' |
| 3 | A', B' | C' |
| 4 | A', B', C' | — | wherein n is the number of channels within the downmix signal 103. Of main interest to the calculation of SPAR metadata 105 are the $R_{dd}$, $R_{ud}$ and $R_{uu}$ covariances. The SPAR metadata may be determined within the calculation module 313 of FIG. 3.

4. From this, determine whether it is possible to cross-predict any remaining portion of the fully parametric channels (i.e., the u channels) from the residual channels being sent (i.e., from the d channels).

The cross-prediction coefficients C may be calculated as follows:

$$C = R_{ud}(R_{dd} + I \max(\epsilon, tr(R_{dd})*0.005))^{-1}$$

Therefore, C may have the shape (1×2) for a 3-channel downmix, and (2×1) for a 2-channel downmix 5. Calculate the remaining energy in parameterized channels that should be filled in by decorrelators 201. The residual energy in the upmix channels $Res_{uu}$ is the difference between the actual energy $R_{uu}$ (post-prediction) and the regenerated cross-prediction energy $Reg_{uu}$.

$$Reg_{uu} = CR_{dd}C^H$$

$$Res_{uu} = R_{uu} - Reg_{uu}$$

$$P = \sqrt{\frac{Res_{uu}}{\max(\epsilon, R_{WW}, \text{scale} * tr(|Res_{uu}|))}}$$

The scale parameter is a constant, with 0≤scale≤1. Th scale parameter may be frequency dependent. In particular, different values of the scale parameter may be used for different frequency bands. The decorrelation parameter matrix P may be a covariance matrix, which is Hermitian symmetric, and thus only decorrelation parameters from the upper or lower triangle of the decorrelation matrix may need to be included into the SPAR metadata 105. The diagonal entries are real-valued, while the off-diagonal elements may be complex-valued. The P coefficients dictate how much decorrelated components of the W channel are used to recreate the A, B and C channels, before un-prediction and un-mixing is performed.

In some implementations, only diagonal values of P are computed and sent to the decoding unit 150. These diagonal values may be computed as follows $$P_{diag} = \sqrt{\frac{\text{diag}(Res_{uu})}{\max(\epsilon, R_{WW}, \text{scale} * tr(|Res_{uu}|))}}$$

FIG. 3 illustrates further components of the reconstruction module 170 of the decoding unit 150. In particular, the reconstruction module 170 may comprise a remixing module 322 configured to remix the channels according to the above-mentioned remixing methodology. Furthermore, the prediction parameters may be used within the un-prediction module 321 to generate the channels of the reconstructed multi-channel signal 111 from the reconstructed residual channels.

The present document addresses the technical problem of modelling the spatial parameters of background noise in a voice communication system, such that the decoding unit 150 can generate high quality spatial comfort noise using these spatial parameters and a multi-channel excitation signal. The multi-channel excitation signal may be a multi-channel white noise signal where all channels are generated with different seed and are uncorrelated with each other.

For this purpose, the encoding unit 100 may be configured to sample the ambient noise and to encode one or more parameters which describe the ambient noise. The one or more parameters for the spatial aspect of the noise may be estimated, encoded, and sent during periods of "No voice activity" to the decoding unit 150. The decoding unit 150 may be configured to recreate the noise to be played out based on the one or more parameters.

In other words, a method of encoding spatial background noise with a relatively small set of parameters is described, in order to allow transmission of the one or more parameters to the decoding unit 150. The one or more parameters may be used to create spatial comfort noise at the receiving end of a transmission system. The term spatial means that the noise has ambiance associated with left/right, up/down, and/or front/back. The noise may be anisotropic such that there may be a stronger ambient noise in one direction than in another direction. The spatial noise may be constructed to be played out in conjunction with headtracking at the decoding unit 150, when played out over loudspeakers.

The general methodology of generating spatial comfort noise at the decoder is addressed in in U.S. Pat. No. 10,224,046, which is incorporated in its entirety by reference. The present document addresses the technical problem on how to model spatial comfort noise at the encoding unit 100. This document specifically addresses a procedure for modeling and/or quantizing one or more spatial parameters for spatial comfort noise at the encoding unit 100 so that spatial comfort noise can be generated at the decoding unit 150.

The method described in this document characterizes the spatial characteristics of the ambient noise as being distinct from the mechanisms of characterizing the frequency spectrum of ambient noise. Specifically, this document describes the creation of one or more spatial comfort noise parameters when utilizing a mono codec comfort noise encoder, wherein the spatial comfort noise parameters characterize the spatial component of the noise. The spatial and spectral components may be used at the decoding unit 150 to generate spatial comfort noise.

An input audio signal 101 may be provided to the encoding unit 100, wherein the input audio signal 101 comprises a series of frames. The frames may e.g., have a temporal length of 20 ms. The series of frames may comprise a subset of audio or voice frames and a subset of frames which consist only of background noise. An example sequence of audio frames may be considered A---A--S----S----S---S---S----S---S--S----S---S----S---
S---S---S----S---S---S----S---S---S----S---A---A--
A--A wherein "A" indicates an active speech and/or audio frame, and wherein "S" indicates a silence frame (also referred to herein as inactive frame).

For a discontinuous transmission (DTX) system, where the actual bitrate of the codec may be substantially reduced during inactive frames by only sending noise shaping parameters and by assuming that background noise characteristics do not change as frequent as active speech or audio frames, the above sequence may be translated into the following sequence of frames by the encoding unit 100:

AB-AB-SID-ND-ND-ND-ND-ND-ND-ND-SID-ND-
ND-ND-ND-ND-ND-ND-SID-ND-ND-ND-ND-
AB-AB-AB-AB wherein "AB" indicates an encoder bitstream for an active frame, wherein "SID" indicates a silence indicator frame, which comprises a series of bits for comfort noise generation, and wherein "ND" indicates no data frames, i.e., nothing is transmitted to the decoding unit 150 during these frames.

Hence, the encoding unit 100 may be configured to classifying the different frames of the input signal 101 into active (A) or silent (S) frames (which are also referred to as inactive frames). Furthermore, the encoding unit 100 may be configured to determine and encode data for comfort noise generation within a "SID" frame (which corresponds e.g., to the current S frame of a series of S frames). The SID frames may be sent repeatedly, in particular periodically, for a series of S frames. By way of example, a SID frame may be sent every $8^{th}$ frame (which corresponds to a time interval of 160 ms between subsequent SID frames, when using 20 ms frames). No data may be transmitted during the one or more following S frames of the series of S frames. Hence, the encoding unit 100 may be configured to perform DTX (discontinuous transmission) or to switch to a DTX mode.

In other words, the encoding unit 100 may be configured to send audio data 106 and encoded metadata 107 to the decoding unit 150 for every active frame. On the other hand, the encoding unit 100 may be configured to send only encoded metadata 107 (and no audio data 106) for a fraction of the inactive frames (i.e., for the SID frames). For the remaining inactive frames (i.e., for the ND frames), no data may be sent at all (not even encoded metadata 107).

The encoded metadata 107 which is sent for a SID frame may be reduced and/or compressed with regards to the encoded metadata 107 which is sent for an active frame.

The encoding unit 100 may comprise a voice activity detector which is configured to switch the encoder to DTX mode. If the DTX flag (e.g., the CombinedVAD flag mentioned below) is set, then packets may be generated in a discontinuous mode based on an input frame, otherwise a frame may be coded as a speech and/or audio active frame.

The encoding unit 100 may be configured to determine a mono downmix signal 103 and the mono downmix signal 103 may be used to detect an inactive frame by operating a Signal Activity Detector or Voice Activity detector (SAD/VAD) on the mono downmix signal 103. For the example of a soundfield B-format input signal 101, the SAD/VAD may be operated on the representation of the W channel signal. In an alternative example, the SAD/VAD may be operated on multiple (notably all) channel signals of the input signal 101. The individual results for the individual channel signals may then be combined into a single CombinedVAD flag. If the CombinedVAD flag is set, a frame may be considered to be inactive. On the other hand, if the CombinedVAD flag is not set, the frame may be considered to be active.

Hence a VAD and/or SAD may be used to classify the frames of a sequence of frames into active frames or inactive frames. Encoding and/or generating comfort noise may be applied to the inactive frames. The encoding of the comfort noise (notably the encoding of noise shaping parameters) within the encoding unit 100 may be performed such that the decoding unit 150 is enabled to generate high quality comfort noise for a soundfield. The comfort noise that is generated by the decoding unit 150 preferably matches the spectral and/or spatial characteristics of the background noise within the input signal 101. This does not necessarily imply the waveform reconstruction of the input background noise. The comfort noise generated by a soundfield decoding unit 150 for a series of inactive frames is preferably such that the comfort noise sounds continuous with regards of the noise within the directly preceding active frames. Hence, the transition between active and inactive frames at the decoding unit 150 is preferably smooth and non-abrupt.

The decoding unit 150 may be configured to generate random white noise as an excitation signal. The excitation signal may comprise multiple channels of white noise, wherein the white noise in the different channels is typically uncorrelated from one another. The bitstream from the encoding unit 100 may only comprise noise shaping parameters (as encoded metadata 107), and the decoding unit 150 may be configured to shape the random white noise within the different channels (spectrally and spatially) using the noise shaping parameters that have been provided within the bitstream. By doing this, spatial comfort noise may be generated in an efficient manner.

In the following, a method for determining spatial and/or spectral comfort noise parameters at the encoding unit 150 is described. As indicated above, an "active frame" may be a frame, within which a voice and/or audio signal is detected. A "non- or inactive frame" may be a frame, within which no voice and no speech is detected, such that only background noise is present. The frames may be classified into active and inactive frames using a voice and/or speech detection (VAD and/or SAD) algorithm.

WYZX may be the four channels of a B-format soundfield signal. The abbreviation CNG may refer to Comfort Noise Generation. The abbreviation SPAR may refer to SPAtial Reconstructor. As outlined in the context of FIG. 3, the SPAR scheme may be an algorithm that takes an input 101 with N channels (preferably FOA input with N=4) and generates a downmix 103 such that the number n of downmix channels (dmx_ch) are $1 \leq n \leq N$, as well as spatial metadata 105 (the so-called SPAR parameters). Furthermore, the SPAR scheme reconstructs a multi-channel signal 111 with N channels from the (reconstructed) downmix 103, 114 with n channels 103, using the set of SPAR parameters 105.

The SPAR parameters 105 for an FOA input signal 101 may comprise PR (prediction coefficients), C (Cross term) coefficients, and P (decorrelator) coefficients. Ypred or Y' may be the residual of the Y channel signal after linear prediction from one or more other channel signals (notably from the W channel signal). Xpred or X' may be the residual of the X channel signal after linear prediction from one or more other channel signals (notably from the W channel signal). Zpred or Z' may be the residual of the Z channel signal after linear prediction from one or more other channel signals (notably from the W channel signal).

It should be noted that even though the present document primarily refers to the modelling of spatial noise in a soundfield signal, the methods which are described herein are not limited to soundfield signals and may be applied to any multiple dimension noise field and/or to any kind of multi-channel signal. In particular, the methods described herein may apply to channel and soundfield based encoders for input signals 101 having a dimensionality N of greater than 1 and preferably greater than 2 (i.e., more than stereo).

The method for encoding spatial comfort noise may comprise VAD and/or SAD for a frame of the mono downmix signal 103 (e.g., the W channel signal for a soundfield signal). The encoding of spatial comfort noise parameters may be performed, if the frame is detected to be an inactive frame.

The covariance of the different channel signals of the frame may be determined for a plurality of different frequency bands or subbands. The covariance matrix may be determined as outlined above, however for a reduced number of frequency bands. The smoothing of the covariance, i.e., the smoothing of the covariance matrix, may be performed across a plurality of subsequent frames. Hence, the covariance may be (low pass) filtered across multiple frames using a filter. Different filters may be used for the different frequency bands. In other words, different smoothing functions and/or different forgetting factors may be used in different frequency bands. Hence, temporal smoothing of the covariance may be performed. As a result of this, the data rate for encoding parameters for the background noise may be reduced. Furthermore, audible discontinuities of the spatial comfort noise may be avoided. An example of temporal covariance smoothing is described in U.S. Pat. No. 63,057,533 which is incorporated in its entirety by reference.

The covariance estimate $R_{dtx}$ for comfort noise generation preferably makes use of relatively extensive covariance smoothing. By increasing the forgetting factor for comfort noise modelling, the perception of the spatial characteristics of the noise may be stabilized, thereby avoiding noise that sounds non-stationary which may be perceptually annoying. Hence, the smoothed covariance $R_{dtx}$ for a frame may be determined, and the SPAR metadata 105 may be determined based on smoothed covariance $R_{dtx}$.

In order to allow for a smooth transition between an active frame and a subsequence inactive frame, the covariance calculation scheme may be switched from the normal covariance estimate (used for active frames) to the noise covariance estimate, as soon as the SAD and/or VAD detects an inactive frame.

A frame may comprise a relative short burst or transient (e.g., a voice burst or a knock). Such a transient may be relatively short, e.g., 200 ms. Such a burst may interrupt a sequence of inactive frames. The interruption would normally lead to a reset of the calculation of the covariance (because the short burst of active frames would be calculated using no smoothing or a modified smoothing scheme). The encoding unit 100 may be configured to remove frames that carry a transient or a short burst from the smoothing scheme for determining the covariance estimates. Once a transient or voice burst is detected, then the covariance estimate may be held constant until the burst or transient has ended. For the case, where the burst or transient is relatively short, e.g., 200 ms or less, the covariance smoothing may continue subsequent to the transient (based on a stored covariance prior to the burst or transient). Hence, covariance smoothing may be continued using a stored covariance for the frame that directly preceded the burst or transient. In other words, weighted averaging of the covariances may be continued by excluding the one or more active frames that correspond to a transient or burst.

On the other hand, if the burst lasts for a relatively long time, the covariance estimate may be reset and covariance estimates prior to the reset may not be used for averaging.

By doing this, it may be taken into account that the spatial aspects of background noise are relatively stable through time. By removing transients, knocks, bumps, ticks, etc. from the smoothed covariance calculation, perceivable disruptions of the spatial aspects of the background noise may be avoided in a reliable manner In particular, a reset of the covariance due to the detection of a relatively short sequence of active frames, which may lead to a noticeable artifact, may be avoided.

The SPAR metadata 105 calculation may comprise the calculation of prediction coefficients (Pr), of cross-term coefficients C if 1<n<4, and/or of decorrelator coefficients (P) (as outlined above), wherein n is the number of channels within the downmix signal 103.

As indicated above, for an inactive frame, the covariance may be computed for a reduced number of bands compared to the case of an active frame (e.g., 6 bands instead of 12 bands). The assumption behind reducing the number of bands for inactive frames is that typically less frequency resolution is required for capturing noise parameters, due to the broadband nature of background noise. By reducing the number of bands, the data rate, i.e. the bitrate, may be reduced. Furthermore, only real valued coefficients may be sent from the encoding unit 100 to the decoding unit 150. Hence, a reduced model comprising a reduced number of frequency bands may be used for modelling the background noise. This model allows modelling the spatial characteristics of broadband noise in an efficient manner.

For the case of a two channel downmix 103 (which comprises e.g., the representation of W channel signal and the Ypred or Y' channel signal), the data comprised within the bitstream from the encoding unit 100 to the decoding unit 150 may comprise (for a frame of the input signal 101):
  a representation of the W channel signal encoded by the coding module 140;
  the Ypred channel signal encoded by the coding module 140. As outlined above, the Y pred channel signal may be the uncorrelated part of the Y channel signal, which cannot be predicted from the W channel signal using one or more prediction coefficients;
  the (real-valued) prediction coefficients $[pr_Y, pr_Z, pr_X]^T$ for the Y, Z and X channel signals;
  direct coefficients (such as cross prediction coefficients or C coefficients) may not be sent to the decoding unit 150 for inactive frames during DTX; and
  the (real-valued) decorrelator coefficients P which indicate the level of the decorrelated W channel signal that needs to be used to generate the X and the Z channel signals.

Figure 4A:
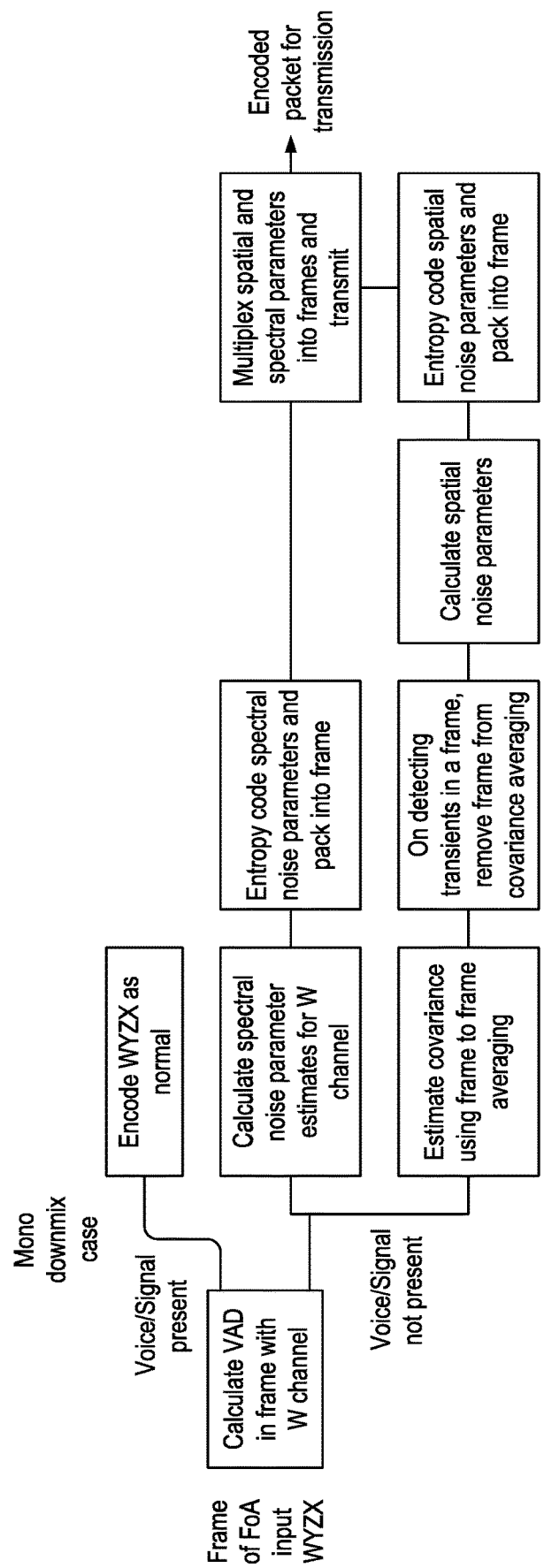
FIGS. 4a to 4c illustrate encoding of an inactive frame of an ambisonics signal for different downmix situations for different downmix situations.
Figure 4B:
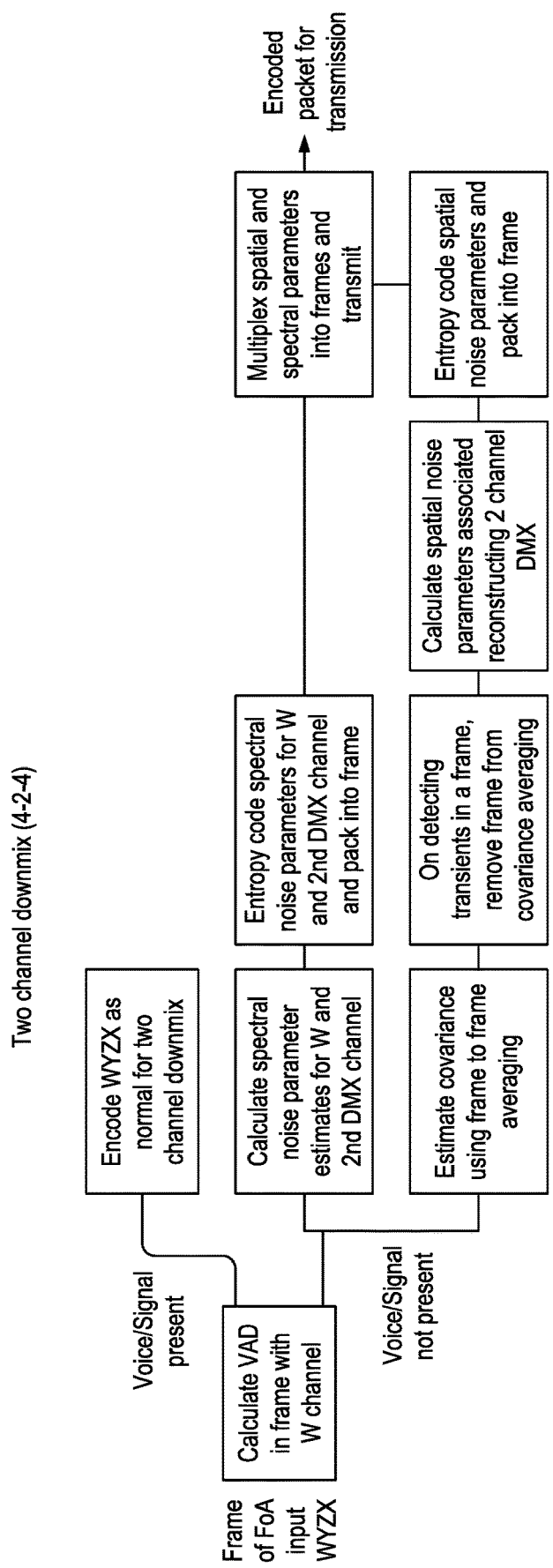

The processing which may be performed by the encoding unit 100 in case of a two channel downmix signal 103 is illustrated in FIG. 4b.

For the case of a full parametric W downmix 103 (comprising only the W channel signal as the downmix signal 103), the data comprised within the bitstream from the encoding unit 100 to the decoding unit 150 may comprise (for a frame of the input signal 101):
  a representation of the W channel signal encoded by the coding module 140;
  the (real-valued) prediction coefficients $[pr_Y, pr_Z, pr_X]^T$ for the Y, Z and X channel signals; and
  the (real-valued) decorrelator coefficients P which indicates the level of the decorrelated W channel signal that needs to be used to generate the Y, the X and the Z channel signals.

Figure 4C:
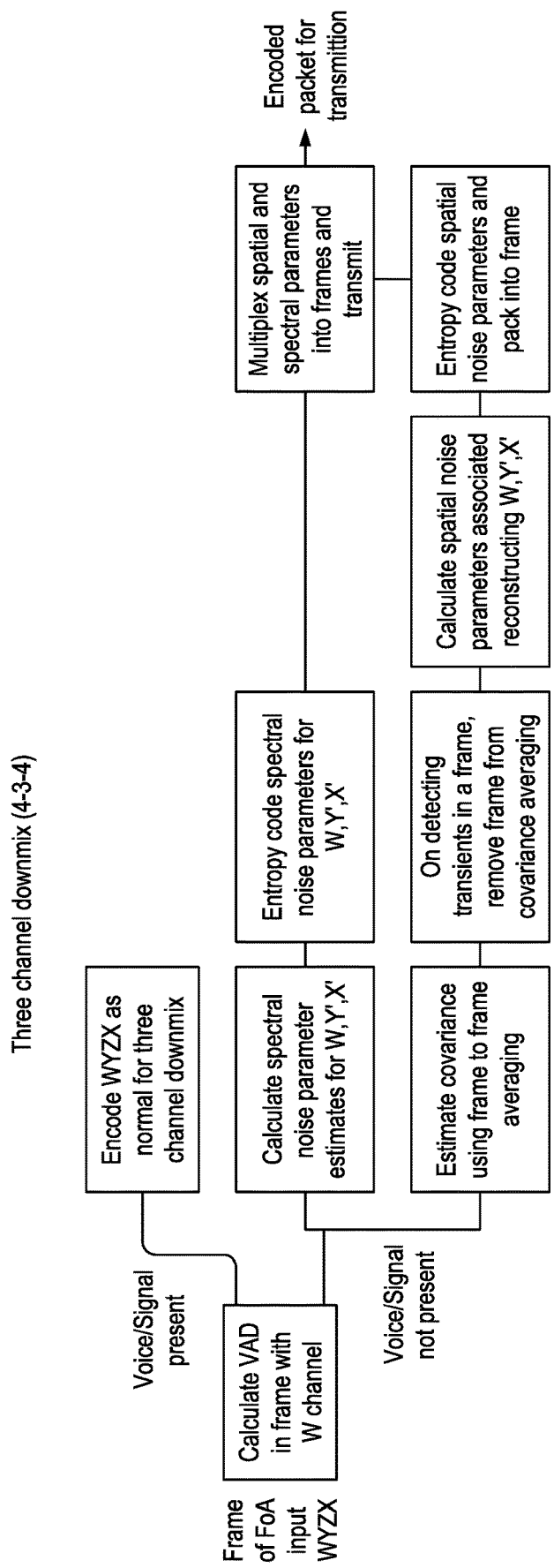

The processing which may be performed by the encoding unit 100 in case of a one channel downmix signal 103 is illustrated in FIG. 4a. FIG. 4c illustrates the case of a three channel downmix signal 103.

For the case of a downmix to a single mono channel (for example a 3-1-3 or 4-1-4 downmix, indicating that a multi-channel input signal 101 with 3 or 4 channels is downmixed to 1 channel and upmixed to 3 or 4 channels), only audio data 106 regarding the mono (W') channel downmix signal 103 (which may be a representation of the W channel) is included into the bitstream. The SPAR metadata 105 may be used to generate a FOA spatial comfort noise based on the reconstructed downmix signal 114. When the encoding unit 100 detects an inactive frame, the calculation of the SPAR metadata 105 is adapted, as outlined in the present document. In particular, the first inactive frame subsequent to an active frame may be encoded to provide a SID frame. For this purpose, the encoded SPAR metadata 107 may be provided within the bitstream for the first inactive frame. Furthermore, during a series of inactive frames, further SID frames may be provided repeatedly, in particular periodically.

For the one channel downmix example, the decoding unit 150 may be configured to generate a reconstructed downmix signal 114 based on the audio data 106. This reconstructed downmix signal 114 may be referred to as $W_{CNG}$, which, during inactive frames, may include a parametric reconstruction of background noise present in the uncoded representation of the W channel in the downmix using white noise as an excitation signal and using spectral shaping parameters coded by a mono audio codec (e.g., EVS). The three decorrelated channels for reconstructing the Y, X and Z channel signals may be generated from $W_{CNG}$ using decorrelators 201 (e.g., time domain or filterbank domain decorrelators). Alternatively, three decorrelated channels for reconstructing the Y, X and Z channel signals may be generated by generating uncorrelated comfort noise with different seeds and spectrally shaping the uncorrected comfort noise according to $W_{CNG}$ The SPAR metadata 105 may be applied to $W_{CNG}$ and the decorrelated channels to generate comfort noise in a soundfield format, having the spectral and spatial characteristics of the original background noise.

For the two channel downmix example (4-2-4, for a first order soundfield), the comfort noise parameters for the mono dowmmix (W') channel and for one prediction channel may be provided to the decoding unit 150. The decoding unit 150 may apply a method for generating FOA spatial comfort noise from a two channel downmix 103 and from the SPAR metadata 105. The two downmix channels may be uncorrelated comfort noise signals, one having the spectrum shaped according to the original W channel representation and the other one having the spectrum shaped according to the original residual channel.

For the SID frames, two independent encoder module 140 instances encode spectral information regarding the mono (W') channel and spectral information regarding the residual channel, respectively. Furthermore, two independent instances of the decoding unit 150 may generate uncorrelated comfort noise signals with different seeds. The uncorrelated comfort noise signals may be spectrally shaped based on the representation of the W channel and the residual channel in the uncoded downmix, respectively. The reconstructed W channel may be referred to as $W_{CNG}$ and the reconstructed residual channel may be referred to as PING.

PING typically is a better approximation of the original uncorrelated residual channel compared to decorrelating $W_{CNG}$ and applying decorrelating coefficients (as done in the full parametric approach, which makes use of a single downmix channel only). As a result of this, the perceptual quality of the background noise is typically higher, when using a multi-channel downmix signal 103.

The two decorrelated channels may be created by running $W_{CNG}$ through time domain or filterbank domain decorrelators or by generating uncorrelated comfort noise with different seed and by spectrally shaping the uncorrelated comfort noise channels as per $W_{CNG}$ $W_{CNG}$, PING comfort noise signals and the two decorrelated signals may then be upmixed to an FOA output using the SPAR metadata 105.

Since the downmix signals 103 are continuously running with the same downmix configuration in active and inactive frames, background noise typically sounds smooth even during transition frames. Furthermore, since the decoding unit 150 is using the prediction coefficients and the decorrelation coefficients computed by the SPAR encoder 120, spatial properties are replicated in the comfort noise which is generated by the SPAR decoder 150.

The C coefficients or cross prediction coefficients may be set to 0, thereby further reducing the data rate for inactive frames during DTX. An alternate implementation of comfort noise modelling may include the C parameters.

In an example implementation of the comfort noise modelling the upper or lower triangle parameters of the P matrix are not used. Only the real-valued diagonal elements of the P matrix may be used to model the comfort noise. In an alternative implementation of the comfort noise modelling the upper or lower triangle parameters of the P matrix may be taken into account.

For the case of a 4-3-4 downmix, mono codec CNG parameters may be generated and sent for the mono representation of the W downmix channel and for two prediction channels. The FOA spatial comfort noise may then be generated from a three channel downmix 103 and from the SPAR metadata 105. The three downmix channels may be uncorrelated comfort noise signals, one having the spectrum shaped as uncoded W channel representation in the downmix and the other two having the spectrum shaped as uncoded Y residual channel and X residual channel in the downmix.

FIGS. 4a, 4b and 4c illustrate a frame-by-frame calculation of the spatial comfort noise parameters when encoding an FOA input signal 101 with one, two, or three channel downmixes 103, respectively. Y' indicates the residual after predicting the Y channel from the W channels. X' indicates the prediction of the X channel from the W channel.

In a preferred example, uniform quantization of the parameters Pr (prediction coefficients) and/or P (decorrelator coefficients) may be performed. The quantization scheme may depend on the direction of the noise. In particular, the number of quantization points which is allocated to the different channels may be dependent on the direction of the noise.

Quantization of the prediction coefficients (Pr) may be performed as follows:
  for the 4-1-4 case, prediction coefficients may be quantized with uniform quantization. The coefficients may be quantized between −1.2 and 1.2 with 9 uniformly distributed quantization points.
  for the 4-2-4 case, the prediction coefficients corresponding to Y' and X' may be quantized between −1 and 1 with 9 uniformly distributed quantization points. The prediction coefficients corresponding to the Z' channel may be quantized between −1 and 1 with 7 uniformly distributed quantization points. The increased number of quantization points for Y' and X' compared to Z' may be due to the increased perceptual importance of the Y and X' channels compared to the Z' channel.
  for the 4-3-4 case, the prediction coefficients corresponding to Y' may be quantized between −1 and 1 with 9 uniformly distributed quantization points. The prediction coefficients corresponding to the X' channel may be quantized between −1 and 1 with 7 uniformly distributed quantization points. The prediction coefficients corresponding to the Z' channel may be quantized between −1 and 1 with 5 uniformly distributed quantization points.

Quantization of the decorrelation coefficients (P) may be as follows;
  the decorrelation coefficients may be quantized between 0 and 1.6.
  for the 4-1-4 case, additional diffuseness may be added by boosting the decorrelation coefficients (this may be performed only when the decorrelation coefficients are relatively low, e.g., below 0.4). The (boosted) decorrelation coefficients may then the quantized using 7 uniformly distributed quantization points. By boosting the decorrelation coefficients, a non-uniform quantization may be achieved.

for the 4-2-4 case, no boosting may be added and the decorrelation coefficients may be quantized using 7 uniformly distributed quantization points.

for the 4-3-4 case, no boosting may be added and the decorrelation coefficients may be quantized using 3 uniformly distributed quantization points.

It should be noted that the notation N-n-N indicates the number N of channels of the input signal 101, the number n of channels of the downmix signal 103 and the number N of channels of the reconstructed signal 111.

Figure 6A:
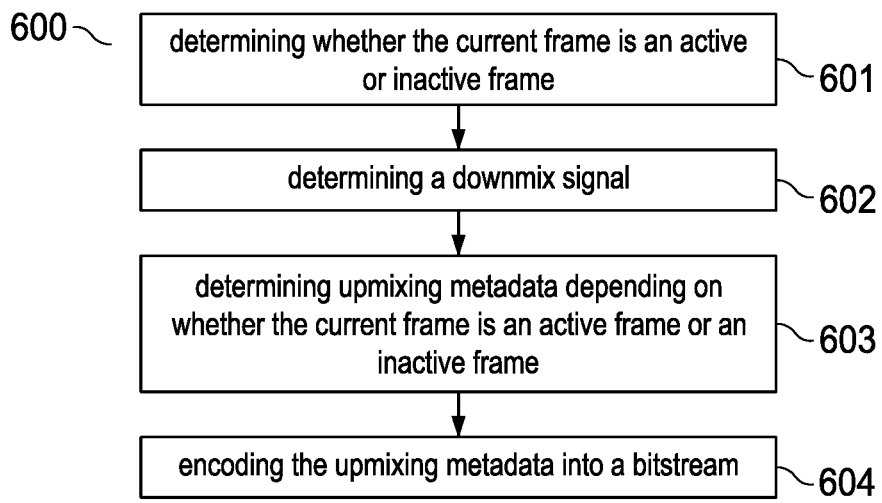
FIG. 6a shows a flow chart of an example method for encoding a multi-channel signal.

FIG. 6a shows a flow chart of an example method 600 for encoding a multi-channel input signal 101 which comprises N different channels, with N being a positive integer greater than one, preferably N>2. The multi-channel input signal 101 may be an SR signal, in particular an ambisonics signal, such as a FOA signal. The input signal 101 comprises a sequence of frames, wherein each frame may cover a certain temporal length of the input signal 101, e.g., between 10 ms and 30 ms. A frame of the multi-channel input signal 101 typically comprises a block of multi-channel PCM data. In particular, a frame may comprise audio samples (at a certain sampling rate of e.g., 20 kHz or more, or 40 kHz or more, in particular 48 kHz) for a certain temporal segment (of e.g., 20 ms) for each channel of the multi-channel input signal 101.

The method 600 may be repeated for each frame of the sequence of frames. The method 600 may comprise, for a current frame of the sequence of frames, determining 601 whether the current frame is an active frame or an inactive frame using a signal and/or a voice activity detector. In other words, the current frame may be classified in being an active frame (which comprises a signal, notably speech) or being an inactive frame (which comprises (only) background noise). For this purpose, the samples of the current frame may be analyzed, e.g., with regards to the energy of the audio signal within the current frame and/or with regards to the spectral composition of the audio signal within the current frame. The SAD and/or VAD may be performed based on a single channel (e.g., the W channel) of the multi-channel input signal 101 or based on multiple, in particular all, channels of the multi-channel input signal 101.

Furthermore, the method 600 may comprise determining 602 a downmix signal 103 based on the multi-channel input signal 101 and/or based on the operating and/or target bitrate, wherein the downmix signal 103 typically comprises less than or equal to N channels. In particular, the downmix signal 103 comprises n channels, with typically n≤N, preferably n<N. The number n of channels of the downmix signal 103 may be equal to the number N of channels of the multi-channel input signal 101, in particular for relatively high bit rates. The downmix signal 103 may be generated by selecting one or more channels from the multi-channel input signal 101. The downmix signal 103 may e.g., comprise the W channel of a FOA signal. Furthermore, the downmix signal 103 may comprise one or more residual channels of the FOA signal (which may be derived using the prediction operations described herein).

The downmix signal 103, in particular the number n of channels of the downmix signal 103, is typically determined in dependence on the target data rate for the bitstream.

The method 600 may further comprise determining 603 upmixing metadata 105, in particular SPAR metadata, comprising a set of parameters. The upmixing metadata 105 may be determined such that it allows generating a reconstructed multi-channel signal 111 comprising N channels based on the downmix signal 103 (or based on a corresponding reconstructed downmix signal 114). The set of parameters of the upmixing metadata 105 may describe and/or model one or more spatial characteristics of audio content, in particular of noise, comprised within the current frame of the multi-channel input signal 101.

As indicated above, the multi-channel input signal 101 may comprise an ambisonics signal, notably an FOA signal, with a W channel, a Y channel, a Z channel and an X channel. The set of parameters of the upmixing metadata 105 may comprise prediction coefficients for predicting the Y channel, the Z channel and the X channel based on the W channel, thereby providing residual channels, referred to as Y' channel, Z' channel and X' channel, respectively. The prediction coefficients are referred to herein as Pr or PR. The downmix signal 103 may comprise a representation of W channel and one or more residual signals (in particular, the one or more residual signals having the highest energy).

If the downmix signal comprises a first residual channel in addition to the W channel representation, a cross-prediction parameter may be determined (possibly as part of the upmixing metadata 105), wherein the cross-prediction parameter is dependent of the covariance between the one or more residual channels included in the downmix signal and the one or more remaining residual channels (which are not included in the downmix signal 103). The one or more cross-prediction coefficients are referred to herein as C.

Furthermore, a decorrelation parameter for generating a decorrelated channel when reconstructing a residual channel that has not been included into the downmix signal 103 may be determined based on a covariance of the residual channel. The decorrelation parameter may be referred to herein as P and may be part of the upmixing metadata.

The upmixing metadata 105 may be determined in dependence of whether the current frame is an active frame or an inactive frame. In particular, the set of parameters, which is comprised within the upmixing metadata 105 may depend on whether the current frame is an active frame or an inactive frame. If the current frame is an active frame, the set of parameters of the upmixing parameters 105 may be larger and/or may comprise a higher number of different parameters than if the current frame is an inactive frame.

In particular, the cross-prediction parameter may not be part of the upmixing metadata 105 for the current frame, if the current frame is an inactive frame. On the other hand, the cross-prediction parameter may be part of the upmixing metadata 105 for the current frame, if the current frame is an active frame.

Alternatively, or in addition, if more than one residual channel is included into the downmix signal 103, the set of parameters of the upmixing metadata 105 for the current frame may comprise a decorrelation parameter for each possible combination of a non-included residual channel either with itself or with another one of the non-included residual channels, if the current frame is an active frame. On the other hand, the set of parameters of the upmixing metadata 105 for the current frame may comprise a decorrelation parameter only for the combination of a non-included residual channel with itself, if the current frame is an inactive frame.

Hence, the type of parameters which are included into the upmixing metadata 105 may be different for an active frame and for an inactive frame. In particular, one or more parameters which are less relevant for reconstructing the spatial characteristics of background noise may be omitted for an inactive frame. As a result of this, the data rate for encoding background noise may be reduced without impacting the perceptual quality.

The set of parameters may comprise corresponding parameters for a number of different frequency bands. In other words, the parameters of a given type (e.g., the Pr, the C and/or the P parameters) may be determined for a plurality of different frequency bands (also referred to herein as subbands). The number of different frequency bands, for which the parameters are determined, may depend on whether the current frame is an active frame or an inactive frame. In particular, if the current frame is an active frame, the number of different frequency bands may be higher than if the current frame is an inactive frame.

Hence, the frequency resolution of the set of parameters, which describes the spatial characteristics of the multi-channel input signal may be adapted in dependence of whether the current frame is an active frame or an inactive frame. In particular, a high frequency resolution may be used for an active frame than for an inactive frame. By doing this, the data rate for encoding background noise may be reduced without impacting the perceptional quality.

The method 600 may further comprise encoding 604 the upmixing metadata 105 into a bitstream (wherein the bitstream may be transmitted or provided to a corresponding decoding unit 150). The set of parameters of the upmixing metadata 105 may be entropy encoded to provide coded metadata 107 to be inserted into the bitstream. As a result of this, an efficient encoding of spatial background noise is provided.

The method 600 may further comprise encoding the downmix signal 103 into the bitstream, if, in particular only if, the current frame is an active frame. The one or more channels of the downmix signal 103 may be encoded individually using (one or more instances of) a single channel audio encoder (such as an EVS (enhanced voice services) encoder) to provide audio data 106 to be inserted into the bitstream.

The method 600 may comprise quantizing the parameters from the set of parameters for encoding 604 the upmixing metadata 105 for the current frame into the bitstream, using a quantizer. In other words, a quantizer may be used to quantize the set of parameters, which is to be encoded into the bitstream. The quantizer, in particular the quantization step size and/or the number of quantization steps of the quantizer, may be dependent on whether the current frame is an active frame or an inactive frame. In particular, the quantization step size may be lower and/or the number of quantization steps may be higher for an active frame than for an inactive frame. Alternatively, or in addition, the quantizer, in particular the quantization step size and/or the number of quantization steps of the quantizer, may be dependent on the number of channels of the downmix signal. By doing this, the efficiency of encoding spatial background noise at high perceptual quality may be further increased.

Alternatively, or in addition, the quantizer, in particular the quantization step size and/or the number of quantization steps of the quantizer, may be dependent on the channel and/or on the type of the channel, for which upmixing metadata 105 is encoded. Different channels and/or different types of channels may relate to different directions. By way of example, the quantization step size may be smaller and/or the number of quantization steps may be higher for the Y channel compared to the X channel and/or the Z channel, because left/right cues may be perceptually more important than front/back or up/down cues.

The method may comprise determining a covariance, in particular a covariance matrix and/or a set of covariance values, for the current frame of the multi-channel input signal, by performing temporal smoothing over multiple frames from the sequence of frames. The temporal smoothing may be performed in dependence of whether the current frame is an active frame or an inactive frame. By way of example, the forgetting factor for the temporal smoothing may be dependent on whether the current frame is an active frame or an inactive frame. In particular, if the current frame is an active frame, the forgetting factor may be shorter than if the current frame is an inactive frame. In other words, less temporal smoothing may be performed for an active frame compared to an inactive frame. In an example, the covariance for the current frame may be determined without temporal smoothing, if the current frame is an active frame. On the other hand, the covariance for the current frame may be determined with temporal smoothing, if the current frame is an inactive frame.

The forgetting factor may be frequency dependent. In particular, different forgetting factors, i.e., different values of the forgetting factor, may be used at least for some of the plurality of different frequency bands. Hence, the temporal smoothing of the covariance may be different for different frequencies and/or frequency bands. By doing this, the perceptual quality of the spatial background noise may be further increased.

More smoothing may be performed during inactive frames (compared to active frames) because spatial characteristics of background noise are typically assumed to be more stable as compared to active speech or general audio. This may also provide a more stable spatial comfort noise experience at the decoder output.

The forgetting factor may be dependent on the bandwidth of the different frequency bands. In particular, the forgetting factor for a frequency band may depend on the bandwidth of the frequency band. The forgetting factor may increase with the frequency resolution of the frequency bands (and vice-versa).

One or more parameters of the upmixing metadata (notably the one or more prediction parameters, the one or more cross-prediction coefficients and/or the one or more decorrelation parameters) may be determined in a precise manner based on the covariance for the current frame.

Hence, temporal smoothing of the covariance (which is the basis for describing the spatial characteristics) may be performed for inactive frames comprising background noise. By doing this, the perceptual quality of the reconstructed background noise at the decoding unit 150 may be improved. Furthermore, the data rate efficiency may be improved (due to an improved performance of entropy encoding).

The method 600 may comprise identifying one or more frames from the sequence of frames, which correspond to a transient noise or talk burst. A transient noise and/or a talk burst may be acoustic events which last at the most for a pre-determined burst duration threshold. The burst duration threshold may e.g., be set between 100 ms and 300 ms, e.g., at 200 ms. It may be of perceptual importance to capture spatial parameters for a transient noise and/or talk burst without temporal smoothing so that the decoding unit 150 can reconstruct the transient noise and/or talk burst at its correct spatial location. However, it may also be of perceptual importance to maintain the covariance smoothing filter state to model spatial background noise (without the impact of transient noise and/or talk bursts), as abrupt changes in covariance of background noise may cause audible discontinuity and/or artifacts.

The method 600 may comprise ignoring the one or more identified frames (which comprise the transient noise and/or talk burst) when performing temporal smoothing, and/or removing the one or more identified frames from the temporal smoothing calculation for determining the covariance for the current frame. In other words, one or more intermediate active frames which comprise a relatively short transient noise and/or talk burst may be removed from the temporal smoothing operation of the covariance. As a result of this, the perceptual quality of the spatial background noise may be improved. As a result, abrupt changes in the spatial characteristics of the reconstructed spatial background noise at the decoding unit 150 can be avoided which results in improved perceptual quality.

The method 600 may comprise determining that the current frame is an active frame (directly) following a set of one or more preceding inactive frames from the sequence of frames by less than the pre-determined burst duration threshold. The covariance for the current frame may then be determined without taking into account the current frame. The covariance for the current frame may then be determined based on a reference covariance which has been determined based on the set of one or more preceding inactive frames. Hence, an active frame following a sequence of inactive frames may be ignored during temporal smoothing of the covariance, thereby increasing the perceptual quality of the spatial background noise at the decoding unit 150.

Alternatively, the method 600 may comprise determining that the current frame is an active frame (directly) following a set of one or more preceding inactive frames from the sequence of frames by more than the pre-determined burst duration threshold. In other words, it may be determined that the current frame is not part of a relatively short transient and/or burst, but comprises speech and/or a signal. The covariance for the current frame may then be determined based on samples, in particular only based on samples, from the current frame. Hence, a reset of the covariance calculation may be performed, subsequent to detecting the onset of a speech and/or a signal within the multi-channel input signal 101. As a result of this, the perceptual quality of the reconstructed multi-channel signal 111 may be improved.

The method 600 may comprise determining that the current frame is an inactive frame. In this case, the covariance for the current frame may be stored as the reference covariance for performing temporal smoothing for determining the covariance for one or more subsequent frames from the sequence of frames, which (directly) follow the current frame. By storing the covariance of an inactive frame as a reference covariance for the calculation of the covariance of one of more subsequent (inactive) frames, temporal smoothing may be performed in an efficient manner.

Furthermore, the method 600 may comprise, for the subsequent frame from the sequence of frames, which (directly) follows the current frame, and if the current frame is an inactive frame, determining whether the subsequent frame is an active frame or an inactive frame using the signal and/or the voice activity detector. If the subsequent frame is an inactive frame, the covariance for the subsequent frame may be determined based on samples of the current frame, in particular based on the covariance for the current frame, and based on samples of the subsequent frame (while taking into account a forgetting factor). By doing this, temporal smoothing may be performed in a reliable and efficient manner.

The method 600 may comprise determining a covariance, in particular a covariance matrix, for the current frame of the multi-channel input signal 101 within a number of different frequency bands. As indicated above, the number of frequency bands may be dependent on whether the current frame is an active frame or an inactive frame. In particular, if the current frame is an active frame, the number of frequency bands may be higher than if the current frame is an inactive frame. One or more parameters of the upmixing metadata 105 may then be determined based on the covariance for the current frame. In particular, a plurality of parameters may be determined for the plurality of frequency bands based on the corresponding plurality of covariances for the plurality of frequency bands. As a result of this, the frequency-dependent parameters may be determined in a reliable and precise manner.

If it is determined that the current frame is an inactive frame, it may be determined whether a preceding frame from the sequence of frames, which directly precedes the current frame, has been an inactive frame. In other words, it may be determined whether the current frame is a SID (silence indicator) frame or an ND (no data) frame. If the preceding frame has been an inactive frame and the number of consecutive inactive frames since the last SID frame is less than a pre-computed SID frame interval (i.e., the current frame is an ND frame), it may be refrained from encoding 604 the downmix signal 103 and/or the upmixing metadata 105 for the current frame into the bitstream, thereby further reducing the data rate for signaling spatial background noise. On the other hand, if the preceding frame has been an active frame or the number of consecutive inactive frames since the last SID frame is equal to the pre-computed SID frame interval (i.e., the current frame is a SID frame), the downmix signal 103 and the upmixing metadata 105 for the current frame may be encoded into the bitstream, thereby providing a precise signaling of spatial background noise.

If the current frame is an active frame, each channel of the downmix signal 103 may be encoded individually using an instance of a mono audio encoder (such as EVS), wherein the mono audio encoder may be configured to encode the audio signal within a channel of the downmix signal 103 into an (encoded) excitation signal and into (encoded) spectral data.

If the current frame is an inactive (SID) frame, each channel of the downmix signal 103 may be encoded individually using an instance of a mono audio encoder (such as EVS). However, in this case, the (encoded) excitation signal may be not be inserted into the bitstream. On the other hand, the (encoded) spectral data may be inserted into the bitstream. As a result of this, spectral data regarding the spectral characteristics of the background noise may be inserted into the bitstream in an efficient manner.

At the corresponding decoding unit 150, the excitation signals of the one or more channels of the downmix signal 103 may be replaced by white noise (wherein the white noise for the different channels is typically independent from one another). Furthermore, the (encoded) spectral data may be used to add the spectral characteristics to the one or more channels of the downmix signal 103 to provide the reconstructed downmix signal 114.

The method 600 may comprise variable rate DTX, wherein the frequency of transmission of SID frames is variable. The frequency of transmission of SID frames may vary in dependence of the change in spatial and/or spectral characteristics of the background noise or signal-to-noise ratio of the input signal 101. As outlined above, the frames of the input signal 101 may be classified into active frames or inactive frames. The sequence of frames of the input signal 101 may comprise a subsequence of inactive frames. In order to provided information regarding the spatial and/or spectral characteristics of the noise comprised within the subsequence of inactive frames, the encoding unit 100 may be configured to repeatedly, in particular periodically, insert SID frames in the bitstream. Each SID frame may comprise the upmixing metadata 105 described in the present document. The frequency or repetition rate for the SID frames may be adapted in dependence of the input signal 101.

In particular, the current inactive frame may be analyzed, in order to determine whether a chance in spatial and/or spectral characteristic of the noise within the current inactive frame has occurred with respect to the previous inactive frame. By way of example, it may be determined whether the value of a distance measure between the upmixing metadata 105 for the current inactive frame and the upmixing metadata 105 of the previous inactive frame is greater than a pre-determined distance threshold. If this is the case, a SID frame may be inserted for the current inactive frame, in order to signal the changed upmixing metadata 105 to the decoding unit 150. If, on the other hand, the value of the distance measure is smaller than the distance threshold, the current inactive frame may be treated as an ND frame.

As outlined above, an input audio signal 101 may be provided to the encoding unit 100, wherein the input audio signal 101 comprises a series of frames. The frames may e.g., have a temporal length of 20 ms. The series of frames may comprise a subset of audio or voice frames and a subset of frames which consist only of background noise. An example sequence of audio frames may be considered

```
A---A--ST---S----S---S---S----S---S---S----S---S----
S---S---S---ST----S---S---S----S---S---S----S---
A---A--A--A
``` wherein "A" indicates an active speech and/or audio frame, and wherein "S" indicates a silence frame (also referred to herein as inactive frame) and "ST" indicates a silence transmitted frame, for which a change in spectral and/or spatial characteristic of background noise is detected and hence spatial and/or spectral parameters are to be coded and sent to the decoding unit 150.

For a discontinuous transmission (DTX) system, for which the actual bitrate of the codec is significantly reduced during inactive frames by only sending noise shaping parameters and assuming that background noise characteristics do not change as frequent as active speech or audio frames, the above sequence may be translated into the following sequence of frames by the encoding unit 100:

```
AB-AB-SID-ND-ND-ND-ND-ND-ND-ND-ND-
ND-ND-ND-SID-ND-ND-ND-ND-ND-ND-
AB-AB-AB-AB
``` wherein "AB" indicates an encoder bitstream for an active frame, wherein "SID" indicates a silence indicator frame, which comprises a series of bits for comfort noise generation, and wherein "ND" indicates no data frames, i.e., nothing is transmitted to the decoding unit 150 during these frames. Note that the frequency of transmission of SID frames in the above sequence is not pre-determined and is dependent on change in spectral and/or spatial characteristics of input background noise.

Hence, the method 600 may comprise, if the current frame is an inactive frame, detecting a change in spatial and/or spectral characteristics of the background noise based on a change in the covariance matrix for the current frame. A SID frame may only be sent, if the change is greater than a pre-determined threshold.

In other words, the method 600 may comprise determining that the current frame is an inactive frame following a subsequence of one or more previous inactive frames (which is directly preceding the current frame). Furthermore, the method 600 may comprise determining whether a spatial and/or spectral characteristic of the background noise comprised within the current frame and/or whether a signal-to-noise ratio of the current frame has changed with regards to the corresponding spatial and/or spectral characteristic of the background noise in the subsequence of one or more previous inactive frames and/or with regards to the signal-to-noise ratio of the subsequence of one or more previous inactive frames.

The method 600 may further comprise encoding 604 the upmixing metadata 105 for the current frame into the bitstream, if, in particular only if, it is determined that the spatial and/or spectral characteristic of background noise comprised within the current frame and/or the signal-to-noise ratio of the current frame has changed with regards to the subsequence of one or more previous inactive frames. Hence, the current frame may be encoded as a SID frame if, in particular, only if, the spatial and/or spectral characteristic of background noise comprised within the current frame and/or the signal-to-noise ratio of the current frame has changed.

Alternatively, or in addition, the method 600 may comprise determining that the current frame is an inactive frame following one or more previous inactive frames. In addition, the method 600 may comprise determining a value of a distance measure (e.g., a mean square error) between the covariance and/or the upmixing metadata 105 for the current frame and a previous covariance and/or previous upmixing metadata 105 for the one or more previous inactive frames. In other words, it may be determined by how much the covariance for the current frame deviates from the corresponding previous covariance for the one or more previous inactive frames, and/o by how much the upmixing metadata 105 for the current frame deviates from the previous upmixing metadata 105 for the one or more previous inactive frames. The previous upmixing metadata 105 may be the upmixing metadata that has been sent in the last SID frame. The previous covariance may be the covariance that has been used for generating the previous upmixing metadata 105.

The method 600 may further comprise determining whether the value of the distance measure is greater than a pre-determined distance threshold. Encoding 604 the upmixing metadata 105 for the current frame into the bitstream may be performed, if, in particular only if, the value of the distance measure is greater than the pre-determined distance threshold. Alternatively, it may be refrained from encoding 604 the upmixing metadata 105 for the current frame into the bitstream, if, in particular only if, the value of the distance measure is smaller than the pre-determined distance threshold.

Hence, the transmission of background noise parameters (i.e., of upmixing metadata 105) may be non-periodic and may be dependent on a change in spatial and/or spectral characteristics of the input background noise and/or of the signal-to-noise ratio. In particular, only if the change in spatial and/or spectral characteristics and/or in signal-to-noise ratio is higher than a pre-determined threshold, background noise parameters may be updated and sent to the decoding unit 150.

By enabling an adaptive transmission of SID frames, the data rate can be reduced further without impacting the perceptual quality of comfort noise.

The corresponding decoding method may comprise, if the current frame is an inactive frame, determining at the decoding unit 150 if the current frame is a SID frame or NO_DATA frames. Crossfading the spatial background noise parameters in the current SID frame with the spatial background noise parameters in the one or more previous SID frame(s) over a number of NO_DATA frames. For e.g., if $P_{curr\_sid}$ are parameters for the current SID frame, and $P_{prev\_sid}$ are the parameters for the previous SID frame, then the change in background noise parameters $P_{curr\_sid}$-$P_{prev\_sid}$ may be applied over a number x of frames (with x>1), wherein spatial parameters in every subsequent frame are changed by ($P_{curr\_sid}$-$P_{prev\_sid}$)/x. This ensures a smooth transition of spatial comfort noise from one spatial location to another.

The method 600 may comprise, if the (directly) preceding frame of the current frame has been an active frame, determining the number of channels of the downmix signal 103 for the preceding claim and maintaining the same number of channels of the downmix signal 103 for the current frame, as for the downmix signal 103 for the preceding claim. In other words, the number of channels within the downmix signal 103 may be maintained during a transition between an active frame and an inactive frame. As a result of this, the perceptual quality of spatial background noise may be further increased.

As outlined above, the multi-channel input signal 101 may comprise an ambisonics signal with a W channel, a Y channel, a Z channel and an X channel In particular, the multi-channel input signal 101 may be an FOA signal. The method 600 may comprise mixing the W channel with the Y channel, the Z channel and/or the X channel using a mixing factor f, to generate a channel of the downmix signal 103. As a result of the mixing process, a representation of the W channel may be obtained, referred to herein as the W' channel. By mixing information from the Y, Z and/or X channel into the W channel, a modified W' channel is obtained, which comprises more spatial information than the original W channel. As a result of this, the perceptual quality of the encoding scheme may be improved and/or the number of downmix channels within the downmix signal 103 may be reduced.

The mixing factor (which defines the extent to which the Y, Z and/or X channels are mixed into the W channel) may be dependent on whether the current frame is an active fame or an inactive frame. In particular, if the current frame is an active frame, the mixing factor may be higher than if the current frame is an inactive frame. In other words, the Y, Z and/or X channels may be mixed into the W channel at a higher extent for active frames than for inactive frames. By doing this, the perceptual quality of the encoding scheme may be further improved.

Figure 6B:
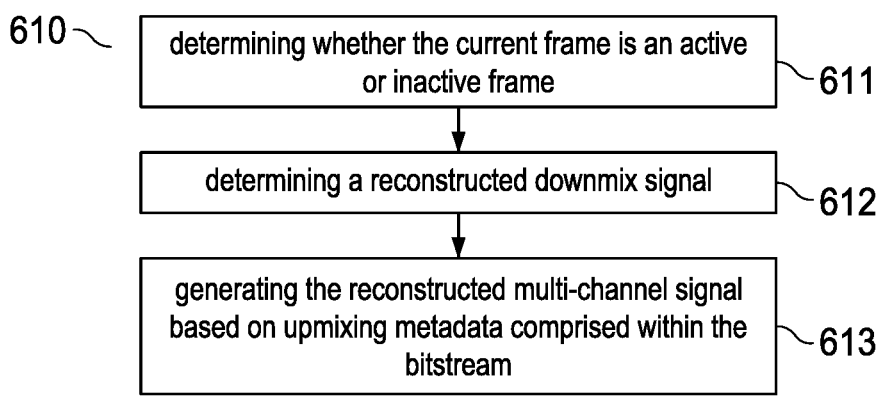
FIG. 6b shows a flow chart of an example method for decoding a multi-channel signal.

FIG. 6b shows a flow chart of an example method 610 for decoding a bitstream which is indicative of a reconstructed multi-channel signal 111 comprising N channels. The bitstream may comprise audio data 106 and/or encoded upmixing metadata 107. The reconstructed signal 111 comprises a sequence of frames.

The method 610 comprises, for a current frame of the sequence of frames, comprise determining 611, based on the bitstream, whether the current frame is an active frame or an inactive frame. This may e.g., be determined based on the encoded upmixing metadata 107 comprised within the bitstream. Furthermore, the method 610 may comprise determining 612 a reconstructed downmix signal 114. The reconstructed downmix signal 114 typically comprises less than N channels (but may comprise N channels). The reconstructed downmix signal 114 may be generated based on audio data 106 comprised within the bitstream, if the current frame is an active frame. On the other hand, the bitstream typically does not comprise audio data 106 for an inactive frame. The reconstructed downmix signal 114 may be generated using a random noise generator, if the current frame is an inactive frame. Statistically independent noise generators may be used for the one or more different channels of the reconstructed downmix signal 114.

The method 610 further comprises generating 613 the reconstructed multi-channel signal 111 based on the reconstructed downmix signal 114 and based on the upmixing metadata 105 comprising a set of parameters. The reconstructed multi-channel signal 111 may be generated in dependence of whether the current frame is an active frame or an inactive frame.

In particular, the method 610 may comprise generating a decorrelated channel for a channel of the reconstructed multi-channel signal 111 that is not included in the reconstructed downmix signal 114. The decorrelated channel may be generated based on the reconstructed downmix signal 103 (notably based on the reconstructed W channel). Furthermore, the method 610 may comprise adding a spatial property to the decorrelated channel based on the upmixing metadata 105, to generate a reconstructed channel of the reconstructed multi-channel signal 111, other than the one or more reconstructed channels comprised within the reconstructed downmix signal 114.

By adapting the reconstruction of the reconstructed multi-channel signal 111, notably of one or more reconstructed channels of the multi-channel signal 111, in dependence of whether a frame of the signal 111 is an active frame or an inactive frame, high quality, spatial background noise may be provided.

As outlined in the context of the corresponding encoding method 600, upmixing metadata 105 is typically only transmitted for a fraction of the inactive frames. The decoding unit 150 may be configured to use the upmixing metadata 105 that has been transmitted within a SID frame for a plurality of inactive frames following the SID frame. In particular, the upmixing metadata 105 may be used until a new SID frame is received. By doing this, high quality comfort noise may be generated in a data rate efficient manner.

The method 610 may comprise determining that the current frame is an inactive frame following one or more previous inactive frames, wherein previous upmixing metadata 105 was used for generating the reconstructed multi-channel signal 111 for the one or more previous inactive frames. Furthermore, the method 610 may comprise determining that the bitstream comprises updated upmixing metadata 105 for the current frame. In other words, it may be determined that the current frame is a SID frame (which comprises updated upmixing metadata 105, for signaling an updated spatial and/or spectral characteristic of the background noise).

The reconstructed multi-channel signal 111 (i.e., the spatial background noise) for the current frame may then be generated based on the updated upmixing metadata 105. By receiving SID frames with updated upmixing metadata 105, changes in the background noise at the encoding unit 100 may be tracked in an efficient manner.

The method 610 may comprise performing metadata smoothing based on the updated upmixing metadata 105 and the previous upmixing metadata 105, to determine smoothed upmixing metadata 105. Metadata smoothing may comprise crossfading from the previous upmixing metadata 105 to the updated upmixing metadata 105 within one or more inactive frames starting with the current frame. The reconstructed multi-channel signal 111 for the current frame may then be determined based on the smoothed upmixing metadata 105.

In other words, spatial metadata smoothing may be performed by the decoding unit 150 and the spatial parameters sent in a current SID frame may be crossfaded with spatial parameters sent in one or more previous SID frames over a number of NO_DATA (ND) frames.

Hence, a smooth transition between the previous spatial and/or spectral characteristics to the updated spatial and/or spectral characteristics of the background noise may be performed within one or more frames. By doing this, the perceptual quality of comfort noise may be further increased.

Furthermore, an encoding unit 100 corresponding to the encoding method 600 and/or a decoding unit 150 corresponding to the decoding method 610 are described in the present document.

Hence, a method 600 of using spatial parameters 105 and same or different downmixes 103 used for active frames to model spatial characteristics of noise are described, thereby allowing comfort noise generation at the decoder 150 that is spatially consistent between active and non-active frames. The method 600 may comprise determining whether a voice signal is present in one or more frames of an audio input 101. In response to determining that no voice signal is present, a covariance may be estimated using frame to frame averaging. Furthermore, spatial noise parameters 105 may be calculated and entropy coding of the spatial noise parameters 105 may be performed. The entropy coded spatial noise parameters 107 may be packed into the bitstream for the one or more frames.

The method 600 may comprise, in response to detecting transients in a frame of the one or more frames, removing the frame from covariance averaging. Calculating the spatial noise parameters 105 may be performed with a smoothed covariance estimation that smoothens across multiple frames to avoid spatial variability in the noise. The method 600 may comprise smoothing covariance across transients and short talk bursts and removing these from the calculation. Alternatively, or in addition, the method 600 may comprise using a limited set of bands and/or limited set of parameters to reduce parameter bit rate for noise and switching back to a full set when audio is present. Alternatively, or in addition, the method 600 may comprise calculating spatial elements separately from spectral elements of the noise to allow re-use of existing comfort noise generators.

Figure 5:
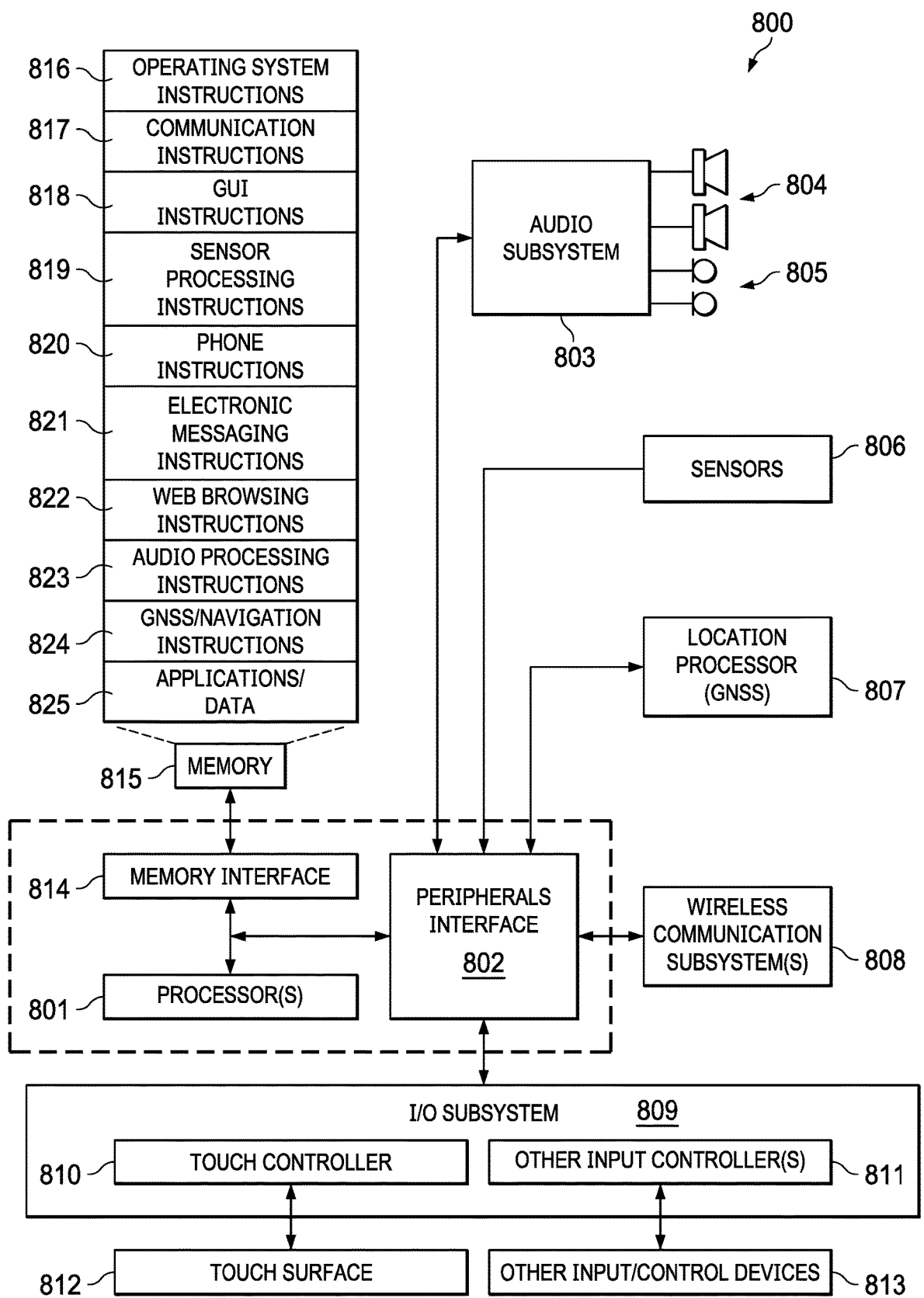
FIG. 5 shows an example device architecture.

FIG. 5 is a mobile device architecture for implementing the features and processes described in reference to FIGS. 1 to 4c. The mobile device may e.g., comprise the decoding unit 150. Architecture 800 can be implemented in any electronic device, including but not limited to: a desktop computer, consumer audio/visual (AV) equipment, radio broadcast equipment, mobile devices (e.g., smartphone, tablet computer, laptop computer, wearable device). In the example embodiment shown, architecture 800 is for a smart phone and includes processor(s) 801, peripherals interface 802, audio subsystem 803, loudspeakers 804, microphone 805, sensors 806 (e.g., accelerometers, gyros, barometer, magnetometer, camera), location processor 807 (e.g., GNSS receiver), wireless communications subsystems 808 (e.g., Wi-Fi, Bluetooth, cellular) and I/O subsystem(s) 809, which includes touch controller 810 and other input controllers 811, touch surface 812 and other input/control devices 813. Other architectures with more or fewer components can also be used to implement the disclosed embodiments.

Memory interface 814 is coupled to processors 801, peripherals interface 802 and memory 815 (e.g., flash, RAM, ROM). Memory 815 stores computer program instructions and data, including but not limited to: operating system instructions 816, communication instructions 817, GUI instructions 818, sensor processing instructions 819, phone instructions 820, electronic messaging instructions 821, web browsing instructions 822, audio processing instructions 823, GNSS/navigation instructions 824 and applications/data 825. Audio processing instructions 823 include instructions for performing the audio processing described in reference to FIGS. 1 to 4c.

Aspects of the systems described herein may be implemented in an appropriate computer-based sound processing network environment for processing digital or digitized audio files. Portions of the adaptive audio system may include one or more networks that comprise any desired number of individual machines, including one or more routers (not shown) that serve to buffer and route the data transmitted among the computers. Such a network may be built on various different network protocols, and may be the Internet, a Wide Area Network (WAN), a Local Area Network (LAN), or any combination thereof.

One or more of the components, blocks, processes or other functional components may be implemented through a computer program that controls execution of a processor-based computing device of the system. It should also be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, physical (non-transitory), non-volatile storage media in various forms, such as optical, magnetic or semiconductor storage media.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method for encoding a multi-channel input signal which comprises N different channels; wherein the input signal comprises a sequence of frames; wherein, for a current frame of the sequence of frames, the method comprises:
   determining whether the current frame is an active frame or an inactive frame using a signal and/or a voice activity detector;
   determining a downmix signal based on the multi-channel input signal; wherein the downmix signal comprises less than or equal to N channels;
   determining upmixing metadata comprising a set of parameters for generating, based on the downmix signal, a reconstructed multi-channel signal comprising N channels, wherein the upmixing metadata is determined in dependance of whether the current frame is an active frame or an inactive frame and wherein the upmixing metadata includes one or more parameters for creating spatial comfort noise and wherein the one or more parameters for creating spatial comfort noise include one or more of a left/right parameter, an up/down parameter or a front/back parameter; and
   encoding the upmixing metadata into a bitstream.

* * * * *